US008850181B2

(12) United States Patent
Black et al.

(10) Patent No.: US 8,850,181 B2

(45) Date of Patent: Sep. 30, 2014

(54) ACCESSING A SECURE TERMINAL

(75) Inventors: Jonathan S. Black, Dundee (GB); Jim Henderson, Dundee (GB)

(73) Assignee: NCR Corporation, Duluth, GA (US)

( * ) Notice: Subject to any disclaimer, the term of this patent is extended or adjusted under 35 U.S.C. 154(b) by 547 days.

(21) Appl. No.: 12/947,512

(22) Filed: Nov. 16, 2010

(65) Prior Publication Data

US 2012/0124365 A1 May 17, 2012

(51) Int. Cl.
*H04L 29/06* (2006.01)
*G07F 7/00* (2006.01)

(52) U.S. Cl.
CPC .......... *G07F 7/00* (2013.01)
USPC .......... 713/150

(58) Field of Classification Search
USPC .......... 713/150
See application file for complete search history.

(56) References Cited

U.S. PATENT DOCUMENTS

| | | | | |
|---|---|---|---|---|
| 5,388,158 | A * | 2/1995 | Berson | 713/176 |
| 2002/0091943 | A1* | 7/2002 | Lau | 713/201 |
| 2003/0100308 | A1* | 5/2003 | Rusch | 455/445 |
| 2004/0199778 | A1* | 10/2004 | Wernet et al. | 713/189 |
| 2005/0102233 | A1* | 5/2005 | Park et al. | 705/44 |
| 2005/0269399 | A1* | 12/2005 | Bensimon et al. | 235/380 |
| 2006/0065733 | A1* | 3/2006 | Lee et al. | 235/462.01 |
| 2007/0192438 | A1* | 8/2007 | Goei | 709/219 |
| 2007/0230703 | A1* | 10/2007 | Barrus et al. | 380/277 |
| 2009/0069000 | A1* | 3/2009 | Kindberg et al. | 455/414.3 |
| 2009/0254479 | A1* | 10/2009 | Pharris | 705/42 |
| 2010/0138344 | A1* | 6/2010 | Wong et al. | 705/44 |

FOREIGN PATENT DOCUMENTS

| | | | |
|---|---|---|---|
| EP | 2131289 | A1 | 12/2009 |
| GB | 2446211 | A | 8/2008 |

OTHER PUBLICATIONS

European Search Report for EP Patent Application No. 11186356.9, mailed May 15, 2012.

* cited by examiner

*Primary Examiner* — Michael S McNally
(74) *Attorney, Agent, or Firm* — Peter H. Priest

(57) ABSTRACT

A method of accessing content on a secure terminal is described. The method comprises: capturing an image of a visual code presented on a display of a secure terminal. The method then involves decoding the visual code to ascertain (i) a set of connection parameters and (ii) a unique identifier. The set of connection parameters are used to establish a connection with the secure terminal. The method also comprises receiving the content from the secure terminal via the established connection in response to transmission of the unique identifier.

20 Claims, 4 Drawing Sheets

ACCESSING A SECURE TERMINAL

FIELD OF INVENTION

The present invention relates to improvements in, or relating to, accessing a secure terminal.

BACKGROUND OF INVENTION

Secure terminals, such as self-service terminals (SSTs), enable a customer to receive valuable media in return for payment. The terminals have to be secure to prevent third parties from forcibly removing the valuable media.

Some SSTs (such as automated teller machines (ATMs)) provide valuable media in tangible form (such as banknotes); whereas, other SSTs (such as entertainment kiosks) provide valuable media in intangible form (such as movies, music, songs, software, and the like). Some SSTs may even provide both. For example, an entertainment kiosk may allow a customer to download a movie (intangible), or to purchase a DVD (tangible) containing the movie.

Entertainment kiosks can transmit intangible media to a customer's handheld device (such as a radio frequency cellular telephone (hereafter "cellphone")) but this transfer must occur in a secure manner to ensure that the media is not intercepted by a third party.

To increase the number of customers that can be served by an entertainment kiosk, it would be desirable to separate (i) delivery of the intangible media from (ii) selection of (and payment for) the intangible media. This may be achieved by opening a separate delivery channel for transmission of the intangible media. However, this would require a separate secure connection, which some customers may not be competent to initiate.

SUMMARY OF INVENTION

Accordingly, the invention generally provides methods, systems, apparatus, and software for providing access to secure content via a visual code including secure connection details.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of accessing content on a secure terminal, the method comprising:

capturing an image of a visual code presented on a display of a secure terminal;

decoding the visual code to ascertain (i) a set of connection parameters and (ii) a unique identifier;

using the set of connection parameters to establish a connection with the secure terminal; and receiving the content from the secure terminal via the connection in response to transmission of the unique identifier.

The content may comprise a movie, a song, music, software, an electronic ticket, an electronic voucher, electronic currency, game, or the like.

The step of capturing an image of a visual code presented on a display of a secure terminal may be implemented by a camera incorporated into a portable device implementing the steps of the method.

The visual code may comprise a barcode, a text string, or the like. The barcode may comprise a two-dimensional (2D) barcode implementing a conventional symbology, such as a QR code (trade mark), a Data matrix code, or the like. A 2D barcode has the advantage that it can store a relatively large amount of data (hundreds of bytes) compared with a 1D barcode.

A set of connection parameters may include two or more of the following: a description of the type of communication technology supported (such as Bluetooth (trade mark), 802.11, 60 GHz, 3G, 4G, WAP, or the like); an identifier (such as a MAC address, an SSID, or the like) associated with a transceiver in the secure terminal with which a connection is to be established; and an access code (such as a passcode, a custom uniform resource locator (URL), or the like) for establishing the connection.

The sub-step of decoding the visual code to ascertain (i) a set of connection parameters, may include the sub-step of ascertaining a plurality of sets of connection parameters, each set of connection parameters relating to a different communication technology. For example, one communication technology may comprise Bluetooth transmission; another communication technology may comprise 802.11g transmission (or similar 802.11 technologies); another communication technology may comprise 60 GHz transmission; yet another communication technology may comprise cellular transmission (such as 3G, 4G, or CDMA technologies).

Where the decoding step ascertains a plurality of sets of connection parameters, the method may comprise the further steps of: presenting a customer (on a display of the customer's portable device) with a plurality of communication technology options corresponding to the communication technology options associated with the sets of connection parameters; receiving a customer selection of one of the plurality of communication technology options; and using the set of parameters associated with the selected communication technology option to establish the connection with the secure terminal.

The step of decoding the visual code to ascertain (i) a set of connection parameters and (ii) a unique identifier may include the sub-step of decrypting data decoded from the visual code to ascertain (i) a set of connection parameters and (ii) a unique identifier.

The step of presenting a customer with a plurality of communication technology options may include presenting the customer with an indication of transfer time to download the content using each communication technology option.

The method may include the further steps of: comparing the communication technology options decoded from the visual code with communication technology options available on a portable device executing the steps; and automatically selecting a communication technology option based on a predefined criterion (such as the communication technology supporting the fastest data transfer).

The method may include the further step of displaying the received content on a display of a portable device.

This aspect has the advantage that a customer can capture an image of a code (such as a barcode), for example using a camera in the customer's cellphone, and then the cellphone can establish a secure channel using data decoded from the barcode.

According to a second aspect there is provided a portable device programmed to implement the method of the first aspect.

The portable device may be a handheld device, a device worn on or integrated into the customer's clothing, or any other convenient portable device.

The portable device may store one or more cryptographic keys for use in decrypting data decoded from the image of the visual code.

According to a third aspect there is provided a secure terminal operable to transmit content to a customer using a separate communication channel to the communication channel used to pay for the content, the secure terminal comprising:

a first transceiver supporting a first communication technology;

a controller coupled to the first transceiver for communicating therewith and programmed to (i) identify content selected by a customer; (ii) assign a unique identifier to the customer-selected content; and (iii) generate a visual code including (a) a set of connection parameters associated with the first communication technology for allowing the customer to establish a session using the first communication technology, and (b) the unique identifier; and a display on which the visual code is presented to the customer.

The controller may be further programmed to receive payment from the customer for the customer-selected content.

The set of connection parameters may include two or more of the following: a description of the type of communication technology supported; an identifier associated with the transceiver in the secure terminal with which a connection is to be established; and an access code for establishing the connection.

The secure terminal may include a second transceiver supporting a second communication technology, and the controller may be programmed to (iii) generate a visual code also including (c) a second set of connection parameters associated with the second communication technology.

The secure terminal may comprise a public-access terminal, such as a self-service terminal (SST). The SST may comprise an automated teller machine (ATM), an entertainment kiosk, or the like.

The controller may be further programmed to change the identifier(s) associated with the transceiver(s). This may be performed: periodically, in response to an event occurring within the terminal, or in response to a command received from a remote system.

The controller may be further programmed to change the access code for establishing the connection. This may be performed: periodically, in response to an event occurring within the terminal (for example, no transaction being performed), or in response to a command received from a remote system.

The secure terminal may include a transaction log storing details of customer-selected content that has been paid for but not downloaded, and customer-selected content that has been downloaded.

According to a fourth aspect there is provided a computer program comprising program instructions for implementing the steps of the first aspect.

According to a fifth aspect there is provided a terminal operable to display a visual code including data relating to (i) a transaction, and (ii) credentials for establishing wireless communication with that terminal.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
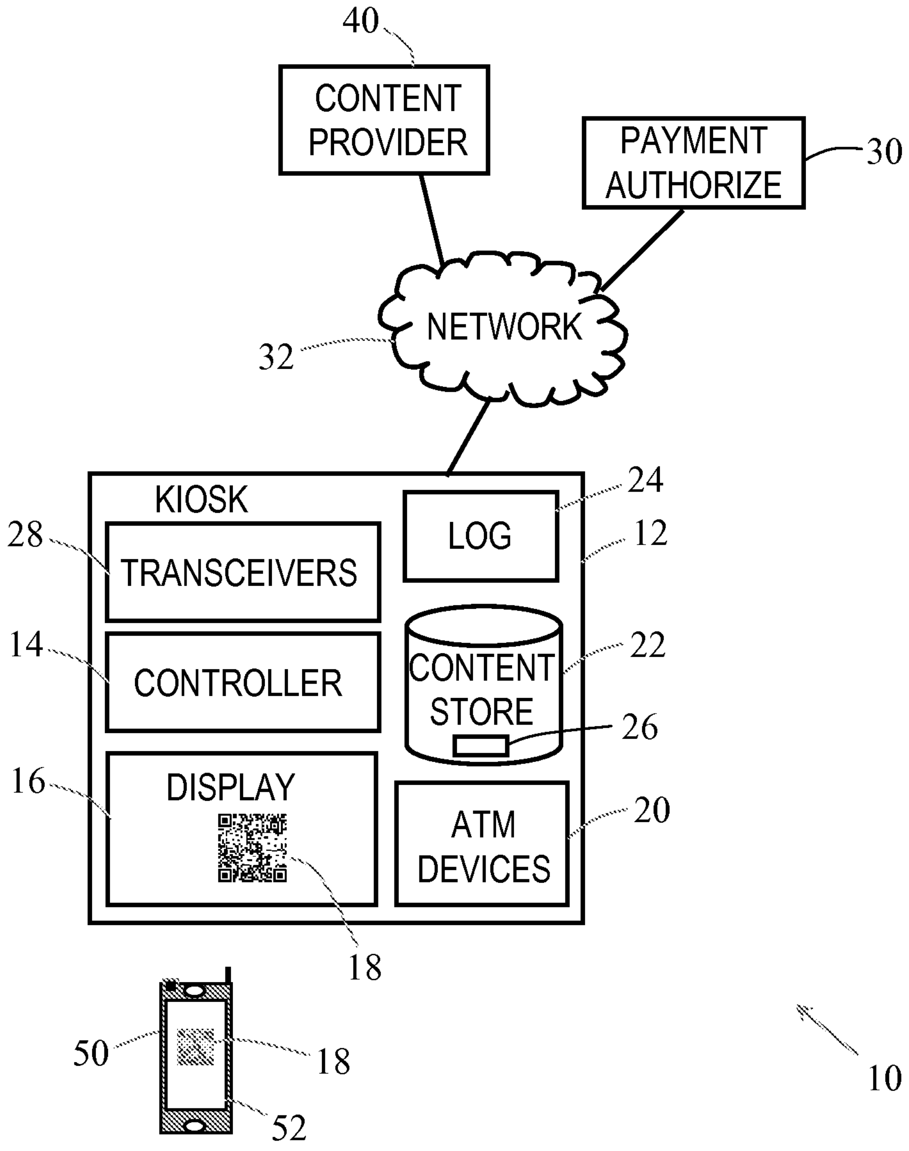
FIG. 1 is a block diagram of a system including a secure terminal according to one embodiment of the present invention interacting with a portable device.

Reference will first be made to FIG. 1, which is a block diagram of a system 10 including a secure terminal 12 according to one embodiment of the present invention.

The secure terminal 12 is in the form of an entertainment kiosk, and comprises: a controller 14 (including a processor, associated memory, firmware, and I/O ports, although these are not illustrated in detail); a display 16 for presenting information to a customer, including a 2D barcode 18 (in the form of a QR code, which is described in more detail below); conventional kiosk devices 20 (such as a receipt printer, a card reader, and the like, although these are not illustrated in detail); a content repository 22; and a transaction log 24.

The content repository 22 stores downloadable content, such as movies, music tracks, songs, games, and software. The content repository 22 also stores a content catalogue 26 listing content that can be viewed by a customer to enable the customer to select content for download.

The secure terminal 12 also includes a set of transceivers 28 for wireless communication with portable devices carried by customers. These transceivers 28 include: an 802.11g transceiver (for WiFi communication) and a Bluetooth transceiver. The secure terminal 12 stores a set of connection parameters for each of these transceivers 28 in the controller 14. Each set of connection parameters includes: a description of the type of communication technology supported (such as Bluetooth (trade mark), 802.11b/g/n, WAP); an identifier (such as a MAC address, an SSID, or the like) associated with each of the transceivers 28; and an access code (such as a passcode) for each communication technology.

The controller 14 is operable to execute a payment application (not shown) to access a payment authorization system 30 via a network 32 so that a customer credit card and/or debit card can be used at the kiosk 12 to pay for content selected by the customer.

The controller 14 is also operable to access a remote content server 40 via the network 32 (or via a separate high speed network (not illustrated)) to receive updated content for storage in the content repository 22.

The system 10 comprises the kiosk 12, the authorization system 30, and the remote content server 40.

A portable device 50 (in the form of a cellular radio frequency transceiver device (cellphone) is used to interact with the system 10 to create a separate communications channel with the kiosk 12.

In this embodiment the cellphone is a Samsung Galaxy S (trade mark) handheld telephone executing the Android 2.1 (trade mark) operating system.

The cellphone 50 (see FIG. 2) comprises one or more processors 52, non-volatile memory 54 (including removable and fixed secure digital memory cards), a data communications interface 56 (including a USB port), a display 58 and associated touch sensitive panel 60, a power management circuit 62 (including a battery, recharging circuitry, and a connection for a DC power supply), a camera 70, a cellular transceiver 72 (including an antenna), an 802.11g (or WiFi) transceiver 74, a loudspeaker 76, and a microphone 78. All of these components are conventional cellphone components.

The cellphone 50 includes firmware 80 (labeled "F/W" in FIG. 2) in non-volatile memory 54 for controlling the above-mentioned components (such as the display 58, the touch sensitive panel 60, the camera 70, and the like).

The cellphone 50 also includes an operating system 82 (labeled "O.S." in FIG. 2), in the form of Android 2.1 (or later) (trade mark) software, and additional functional applications. Many of these functional applications provide functions that are not relevant to this embodiment, so will not be described herein.

Figure 2:
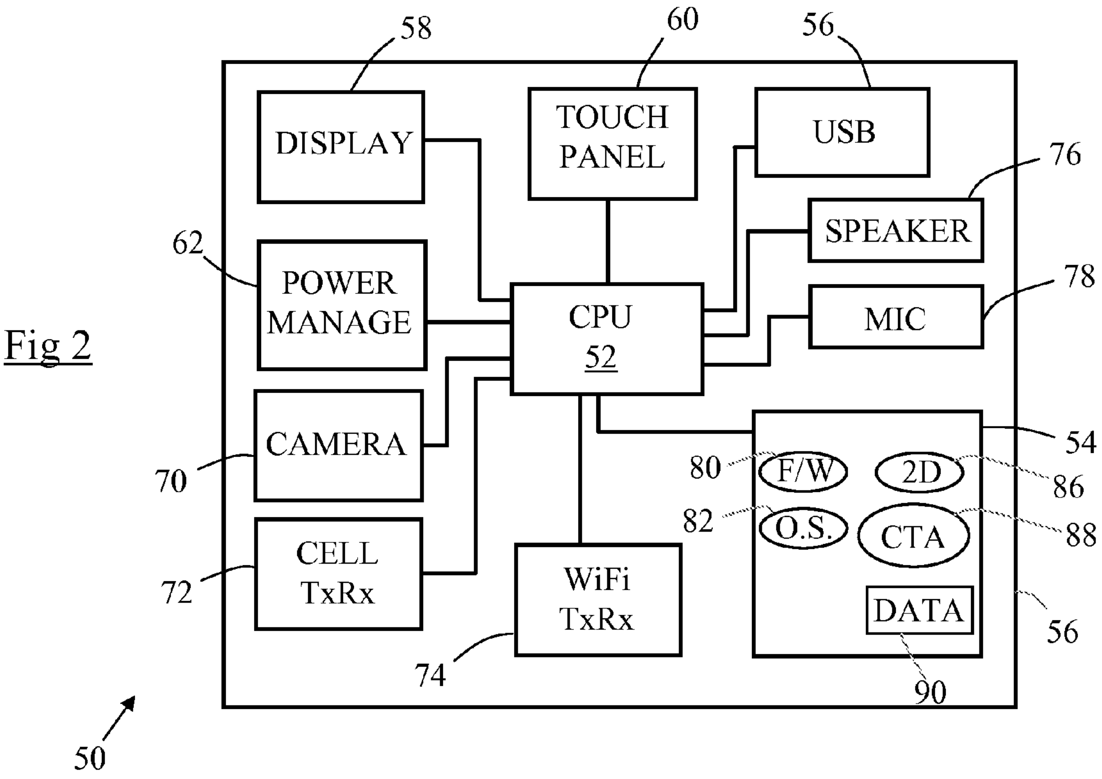
FIG. 2 is a simplified block diagram of the portable device of FIG. 1.
Figure 3:
FIG. 3 is a pictorial diagram illustrating a visual code presented on a display of the secure terminal of FIG. 1 and imaged by the portable device of FIG. 2.

One of the functional applications that is relevant to this embodiment is a barcode scanning and decoding application 86 (labeled "2D" in FIG. 2). This barcode application 86 is based on an open-source, multi-format 1D/2D barcode image processing library that is provided by Zxing (see http://code-.google.com/p/zxing/ for more details). This barcode scanning and decoding application 86 can decode barcodes, such as 2D barcode 18, illustrated pictorially in FIG. 3.

Another functional application used in this embodiment is a content transfer application 88 (labeled "CTA" in FIG. 2). This content transfer application 88 performs a number of different functions, including decrypting data decoded from the 2D barcode 18 using a cryptographic key stored in a secure data store 90 in the non-volatile memory 54, which only the content transfer application 88 can access. In addition, the content transfer application 88 manages initiation of a communication session with the kiosk 12, and transfer of customer-selected content therefrom. The operation of the content transfer application 88 will now be described in more detail with reference to FIG. 4.

Figure 4:
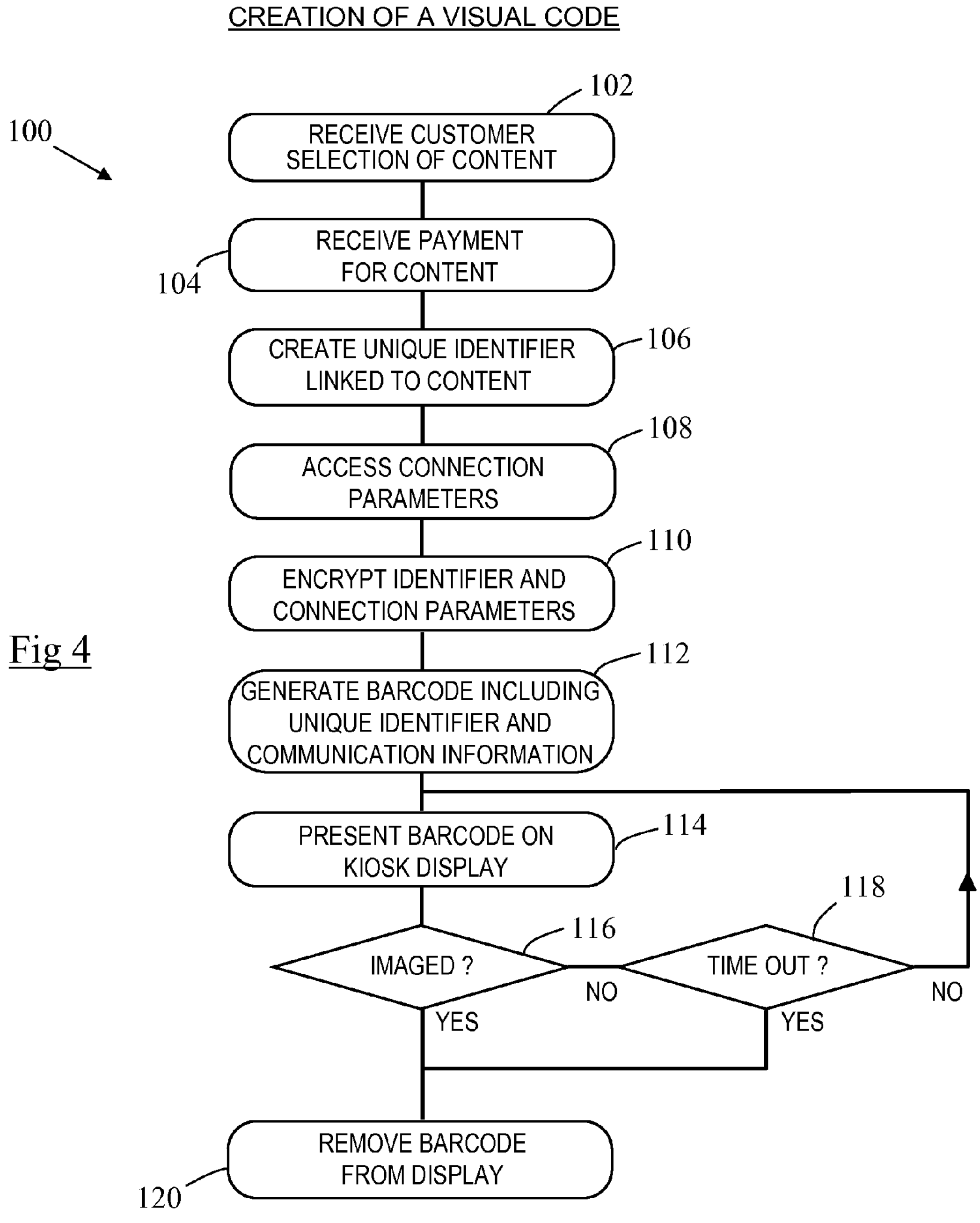
FIG. 4 is a flowchart illustrating steps implemented by the secure terminal of FIG. 1 to generate the visual code of FIG. 3 to enable a customer to access customer-selected content from the secure terminal using the portable device FIG. 2.

FIG. 4 is a flowchart 100 illustrating steps implemented by the kiosk 12 to generate the 2D barcode 18 to enable a customer to access customer-selected content from the kiosk 12 using the customer's cellphone 50.

Initially, the kiosk controller 14 presents the content catalogue 26 to the customer on the kiosk display 16 to allow the customer to select any desired content (step 102). In this example, the customer selects a movie.

The kiosk controller 14 then informs the customer about how much the movie costs, and receives a credit card payment from the customer, which the kiosk controller 14 authorizes via the payment authorization system 30 (step 104).

The kiosk controller 14 then creates a unique identifier for this transaction (step 106). The unique identifier is stored in the transaction log 24 and is used as a reference for the movie selected by the customer (the customer-selected content).

The kiosk controller 14 then accesses the sets of connection parameters stored therein that relate to the transceivers 28 (step 108).

The kiosk controller 14 then uses a cryptographic key to encrypt the unique identifier and the sets of connection parameters to create encrypted session data (step 110).

The kiosk controller 14 then generates the 2D barcode 18 (in the form of a QR code in this embodiment) using the encrypted session data (step 112).

The kiosk controller 14 then presents the generated 2D barcode 18 on the kiosk display 16 (step 114).

The kiosk controller 14 then detects if the 2D barcode 18 has been imaged (step 116). This can be achieved in a number of different ways. One way is for the customer to press a button on the kiosk 12 when he/she has imaged the barcode 18 using his/her cellphone 50. Alternatively, this could be detected automatically, as will be described below.

The 2D barcode 18 is presented on the display 16 until the image has been captured or the transaction times out (step 118). Capture of the 2D barcode 18 is described below with reference to FIG. 5.

When the kiosk controller 14 has detected that the 2D barcode 18 has been captured, then the kiosk controller 14 removes the 2D barcode image 18 from the display 16.

Figure 5:
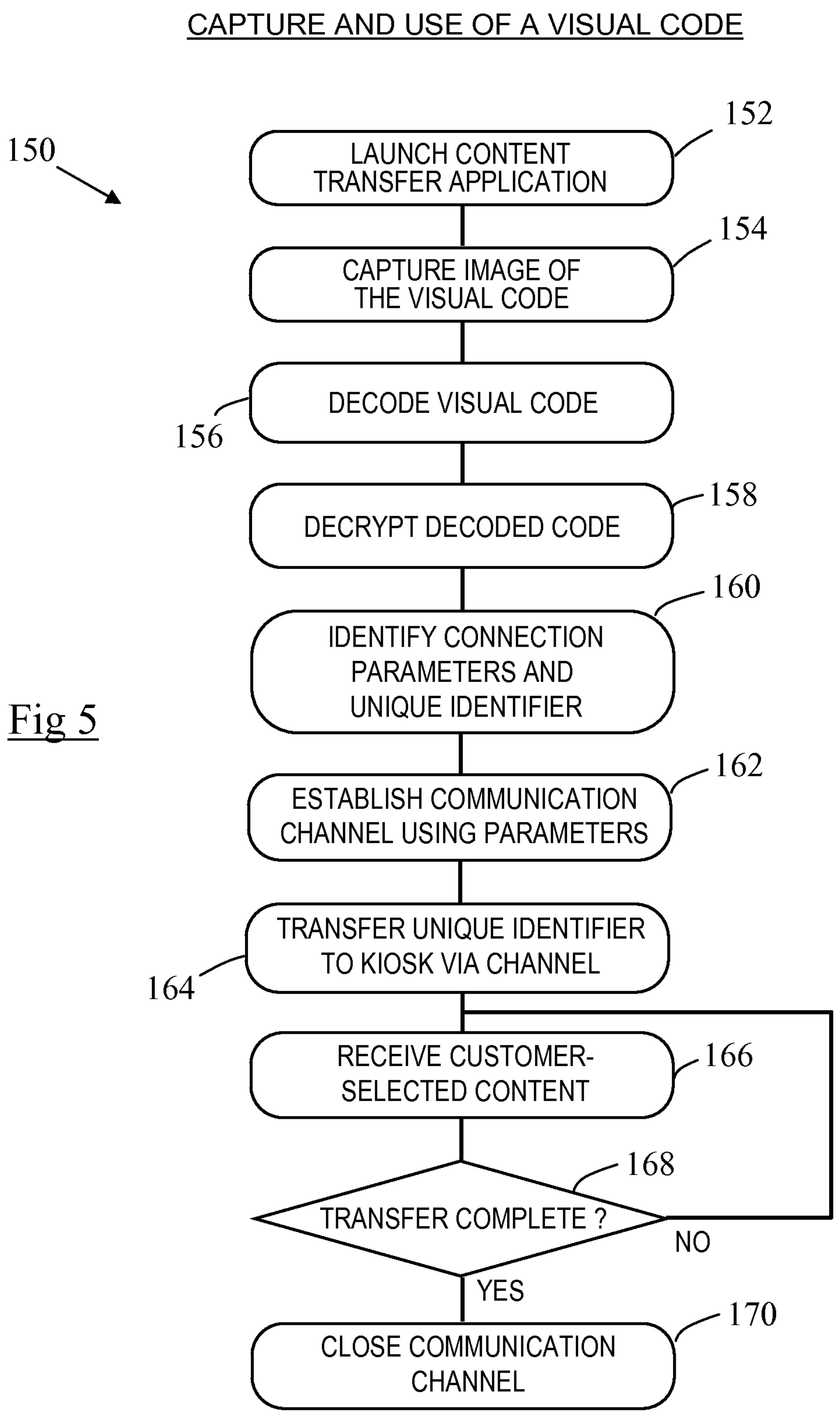
FIG. 5 is a flowchart illustrating steps implemented by the portable device of FIG. 2 to access the secure terminal of FIG. 1 using the visual code of FIG. 3 to download customer-selected content therefrom.

Reference will now be made to FIG. 5, which is a flowchart 150 illustrating steps implemented by the cellphone 50 to access the kiosk 12 using the 2D barcode 18 to download customer-selected content therefrom.

After having selected and paid for the movie at the kiosk 12 (as described above with reference to FIG. 4) the customer executes the content transfer application 88 on his/her cellphone 50 (step 152).

The customer then uses his/her cellphone camera 70 to capture an image of the 2D barcode 18 presented on the kiosk display 16 (step 154).

The content transfer application 88 passes this image of the 2D barcode 18 to the barcode scanning and decoding application 86, which decodes the 2D barcode 18 based on the captured image (step 156) and returns the decoded data to the content transfer application 88.

The content transfer application 88 then access the cryptographic key stored in the secure data store 90 in the non-volatile memory 54 to decrypt the decoded data (step 158).

The content transfer application 88 then ascertains the sets of connection parameters and the unique identifier from the decrypted data (step 160).

The content transfer application 88 then establishes a communications channel with the kiosk 12 using one of the sets of connection parameters (162).

In this embodiment, the content transfer application 88 has an ordered list (from fastest transfer speed to slowest transfer speed) of communication technologies that the cellphone 50 supports. The content transfer application 88 selects the set of connection parameters associated with the fastest communication technology that the cellphone 50 supports. In this embodiment, the fastest communication technology that the cellphone 50 supports is 802.11g via the WiFi transceiver 74.

The set of connection parameters for WiFi includes the SSID of the WiFi transceiver (one of transceivers 28) in the kiosk 12 and the passcode.

Once a communication channel has been established between the cellphone 50 and the kiosk 12, the content transfer application 88 transmits the unique identifier to the kiosk 12 via this communication channel (step 164).

The kiosk controller 14 receives this unique identifier, accesses the transaction log 24 to identify the content associated with this unique identifier (in this example a movie), and then retrieves this identified content from the content repository 22 and transfers the retrieved content to the cellphone 50 via the communication channel established in step 164.

The content transfer application 88 receives this movie (step 166) and detects when the transfer of the movie is complete (step 168). Once this occurs the content transfer application 88 closes the communication channel with the kiosk 12 (step 170) and the customer can view the downloaded movie.

If a third party attempts to capture the barcode image, then he/she will not be able to decrypt the encoded data. Replay attacks are not possible because the kiosk controller 14 will mark the unique identifier as having been received, so it cannot be used to download the same content again.

Another way for the kiosk 12 to detect if the customer has captured an image of the 2D barcode 18 (refer to step 116) is to detect the unique identifier being transferred as part of process 150 (particularly step 164). This will indicate to the kiosk 12 that the customer has captured the 2D barcode 18 and is using data decoded and decrypted therefrom. The kiosk 12 can then immediately cease to present the 2D barcode 18 on the display 16.

Various modifications may be made to the above described embodiment within the scope of the invention, for example, in other embodiments a different visual code may be used, such as a text string.

In other embodiments, the portable device may be integrated into the customer's clothing.

In the above embodiment, a customer is usually, but not necessarily, the owner of the cellphone 50.

In other embodiments, a different cellphone may be used than a Samsung (trade mark) cellphone.

In other embodiments, different communication technologies may be used than those described above, for example, a 60 GHz transceiver may be used to support 60 GHz transmission, an NFC transceiver may be used, or the like. New communication technologies can be supported by adding a suitable transceiver to the kiosk 12, and adding a set of connection parameters for this new communication technology. One transceiver may be operable to support multiple communication technologies.

In other embodiments, the sets of connection parameters may include different and/or additional information to that described above.

In other embodiments, instead of automatically selecting a communication technology, the cellphone may prompt the customer to select a communication technology to use from a list of communication technologies supported by both the kiosk 12 and the cellphone 50.

It should be appreciated that the functional applications described above could be combined into a single application or provided as more applications that described above. The form in which the code is provided (for example, as a single application or as multiple applications) is not essential to the above embodiment.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of accessing specific content selected on a secure terminal that performs a customer paid for transaction, the method comprising:

capturing an image of a visual code presented on a display of a secure terminal, wherein the visual code is presented in response to the customer paid for transaction;

decoding the captured image of the visual code to ascertain (i) sets of connection parameters associated with the secure terminal and (ii) a unique identifier that identifies the customer paid for transaction completed on the secure terminal for the specific content the customer has selected from a plurality of selectable content for download from a content repository located on the secure terminal;

using one of the sets of connection parameters to establish a connection with the secure terminal; and receiving the specific content from the content repository on the secure terminal via the connection in response to transmission of the unique identifier to the secure terminal and the unique identifier received on the secure terminal matching with the unique identifier that identifies the specific content associated with the customer paid for transaction stored in a transaction log in the secure terminal.

2. A method according to claim 1, wherein the content comprises: a movie, a song, music, software, an electronic ticket, an electronic voucher, or electronic currency.

3. A method according to claim 1, wherein the step of capturing an image of a visual code presented on a display of a secure terminal is implemented by a camera incorporated into a portable device implementing the steps of the method.

4. A method according to claim 1, wherein the visual code comprises a barcode.

5. A method according to claim 1, wherein the sets of connection parameters includes at least two of the following: a description of the type of communication technology supported; an identifier associated with a transceiver in the secure terminal with which a connection is to be established; and an access code for establishing the connection.

6. A method according to claim 1, wherein the step of decoding the visual code to ascertain (i) a sets of connection parameters and (ii) a unique identifier includes the sub-step of decrypting data decoded from the visual code to ascertain (i) a set of connection parameters and (ii) a unique identifier.

7. A method according to claim 1, wherein decoding the visual code to ascertain (i) sets of connection parameters, includes a sub-step of ascertaining for each set of connection parameters a different communication technology.

8. A method according to claim 7, wherein the method comprises the further steps of:

presenting a customer with a plurality of communication channel options corresponding to communication technology options associated with the sets of connection parameters;

receiving a customer selection of one of the plurality of communication channel options; and using the set of parameters associated with the selected communication technology option to establish the connection with the secure terminal.

9. A method according to claim 8, wherein the method includes the further steps of comparing the communication technology options decoded from the visual code with communication technology options available on a portable device executing the steps of the method; and automatically selecting a communication technology option based on a predefined criterion.

10. A portable device programmed to implement the method of claim 1.

11. A portable device according to claim 10, wherein the portable device comprises a handheld device.

12. A portable device according to claim 11, wherein the portable device stores one or more cryptographic keys for use in decrypting data decoded from the image of the visual code.

13. The method of claim 1 further comprising:

receiving payment for the transaction by the secure terminal.

14. The method of claim 1, wherein the sets of connection parameters associated with the secure terminal includes a short range wireless transceiver channel.

15. The method of claim 14, wherein the sets of connection parameters includes a device identifier for the short range wireless transceiver.

16. The method of claim 1, wherein the content repository stores movies, music tracks, and software as the content selectable by the customer for purchase.

17. A method according to claim 1, wherein the method comprises the further steps of:

presenting the customer with a plurality of communication technology options including an indication of time to transfer the content corresponding to the communication technology options associated with the sets of connection parameters obtained from the decoding of the visual code.

18. A method of accessing content on a secure terminal for performing a transaction with a customer, the method comprising:

capturing an image of a visual code presented on a display of a secure terminal;

decoding the visual code to ascertain (i) a set of connection parameters and (ii) a unique identifier identifies a transaction with the secure transaction terminal in which the customer has selected content for download from a content repository;

using the set of connection parameters to establish a connection with the secure terminal; and receiving the content from the secure terminal via the connection in response to transmission of the unique identifier and the unique identifier matching with the unique identifier for the transaction stored in a transaction log in the secure transaction terminal, wherein the sub-step of decoding the visual code to ascertain (i) a set of connection parameters, includes the sub-step of ascertaining a plurality of sets of connection parameters, each set of connection parameters relating to a different communication technology, wherein the method comprises the further steps of:

presenting a customer with a plurality of communication technology options corresponding to the communication technology options associated with the sets of connection parameters;

receiving a customer selection of one of the plurality of communication technology options; and using the set of parameters associated with the selected communication technology option to establish the connection with the secure terminal, wherein the step of presenting a customer with a plurality of communication technology options includes presenting the customer with an indication of transfer time to download the content using each communication technology option.

19. A secure terminal for performing a transaction with a customer, the secure terminal operable to transmit content selected by the customer to the customer using a first communication channel different from a second communication channel used to pay for the selected content, the secure terminal comprising:

a first transceiver supporting the first communication channel;

a controller coupled to the first transceiver for communicating therewith and programmed to (i) identify content selected and paid for by the customer from a plurality of selectable content located on a content repository in the secure terminal;

(ii) assign a unique identifier to the customer-selected content;

(iii) generate a visual code including (a) sets of connection parameters associated with the first communication channel for allowing the customer to establish a session using one of the sets of connection parameters associated with the first communication channel, and (b) the unique identifier;

(iv) and store the unique identifier in a transaction log on the secure terminal for later comparison with a unique identifier received on the secure terminal; and a display on which the visual code is presented to the customer.

20. A secure terminal according to claim 19, further comprising a second transceiver supporting the second communication channel, and wherein the controller is programmed to (iii) generate a visual code also including (c) a second set of connection parameters associated with the second communication channel.

* * * * *